Figure 1:
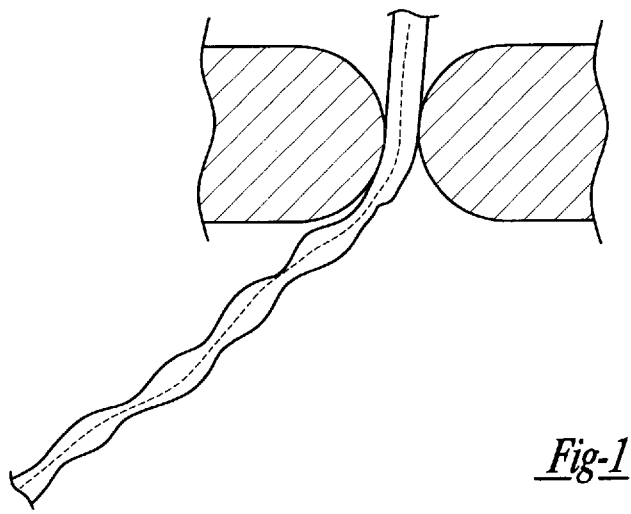

United States Patent

Drouet

[11] Patent Number: 5,834,726
[45] Date of Patent: Nov. 10, 1998

[54] DEVICE FOR MACHINING BY INCLINED WIRE CUTTING ELECTROEROSION

[75] Inventor: Jerome Drouet, Cologny, Switzerland

[73] Assignee: Charmilles Technologies, S.A., Switzerland

[21] Appl. No.: 832,119

[22] Filed: Apr. 3, 1997

Related U.S. Application Data

[63] Continuation of Ser. No. 644,530, May 10, 1996, abandoned.

[30] Foreign Application Priority Data

May 11, 1995 [CH] Switzerland .................. 01 392/95

[51] Int. Cl.$^6$ ..................................................... B23H 7/10
[52] U.S. Cl. ............................................................ 219/69.12
[58] Field of Search ..................... 219/66.12; 204/224 M

[56] References Cited

U.S. PATENT DOCUMENTS 4,736,086 4/1988 Obara ................................. 219/69.12
5,003,147 3/1991 Kawanabe et al. .................. 219/69.12
5,006,691 4/1991 Nakayama ............................ 219/69.12

Primary Examiner—Geoffrey S. Evans
Attorney, Agent, or Firm—Gifford, Krass, Groh, Spinkle, Patmore, Anderson & Citkowski, P.C.

[57] ABSTRACT

An electroerosion device having a wire electrode stretched and wound between two wire guides which performs taper machining by inclining the wire electrode, the wire guides having a guiding profile whose radius of curvature is at least equal to a value R given by the following formula $$\frac{\Delta L}{L} = \frac{r}{r + RL},$$

in which r designates the radius of the wire and $\Delta L/L$ the elongation coefficient corresponding to the limit of elastic deformation of the wire electrode in consideration. Apparatus for measuring and calculating are associated with a numeric control in order to determine, as a function of a given angle of inclination, the height of the two points of inclination of the wire electrode in the wire guides.

2 Claims, 5 Drawing Sheets

KEY  1  HEIGHT OF THE GUIDE
    2  HEIGHT OF THE POINT OF INCLINATION OF THE WIRE

KEY  1  SHIFTED PATH
    2  PROGRAMMED PATH
    3  PIECE TO BE MACHINED
    4  VALUE OF THE SHIFT
    5  DIRECTION OF PROGRESS OF THE PROGRAM
    6  ELECTROEROSION DISTANCE
    7  DIAMETER OF THE WIRE

KEY  1  PROGRAMMED PATH
     2  SHIFTED PATH WITH RELIEF ANGLE 5,834,726

DEVICE FOR MACHINING BY INCLINED WIRE CUTTING ELECTROEROSION

This is a continuation of application Ser. No. 08/644,530 filed on May 10, 1996, now abandoned. International Application 01 392/95-2 filed on May 11, 1995 and which designated the U.S.

The invention relates to a device for wire electroerosion, with a wire electrode which can be inclined with respect to the plane of the path to be cut.

Let us recall that in the majority of these devices, the wire electrode is stretched and wound between two wire guides which can be of the "closed" or "open" type, that is to say in the form of a roller, caster or cylinder, with a peripheral notch or groove where the wire is housed according to a given "guiding profile" preferably situated in a plane perpendicular to the axis of revolution of the guide. "Closed" guides are understood to mean guides with a rotational symmetry, generally in the form of rings, of the thread guide or barrel guide type. The present invention relates to these two types of guides, although in order to simplify, it is described more particularly with respect to guides known as "closed" guides used currently by the applicant on various wire machines.

The wire electrode moves relative to the piece which is to be machined, cutting it by erosive sparks bursting between the wire and the piece according to a predetermined path situated in a plane, here called the "principal plane", which is perpendicular to the part of the wire stretched between the guides. This allows for a "straight cut"; in other words, for the cutting of surfaces for which all the generatrices are perpendicular to the principal plane.

In order to obtain more general shapes, for example, pieces with relief, it is necessary to incline the wire with respect to the normal to the principal plane (called "neutral axis" in the following); the angle of inclination or "relief angle" can vary in the course of machining, in particular when there are changes in the direction of the machining path. Numerous methods have been proposed to produce this relief angle: moving one of the guides with respect to the other, parallel to the principal plane, or moving each according to a determined path, different for each; these movements can be combined with various types of rotation of the wire guides: tilting of two wire guides in order to orient them by aligning their axis of symmetry with the part of the wire stretched between the guides and/or, especially in the case of open guides, rotation in planes parallel to the "principal plane", in particular in order to stabilize the wire in the notch by orienting the latter as a function of the machining path and especially in order to orient the plane of this notch in such a way that it contains the part of the wire stretched between the guides, as described in EP 348,534.

Either the piece moves or the wire guides move with the piece remaining immobile, thanks to a first system with crosswise movements with respect to the X and Y axes. The upper wire guide is moved with respect to the axes U and V (which can be independent from the X and Y axes or can in fact be a second system of axes X' and Y'), thanks to a second system of crosswise movements. The wire is thus inclined with respect to the plane of the path, which produces a conical cut through the piece.

Figure 2:
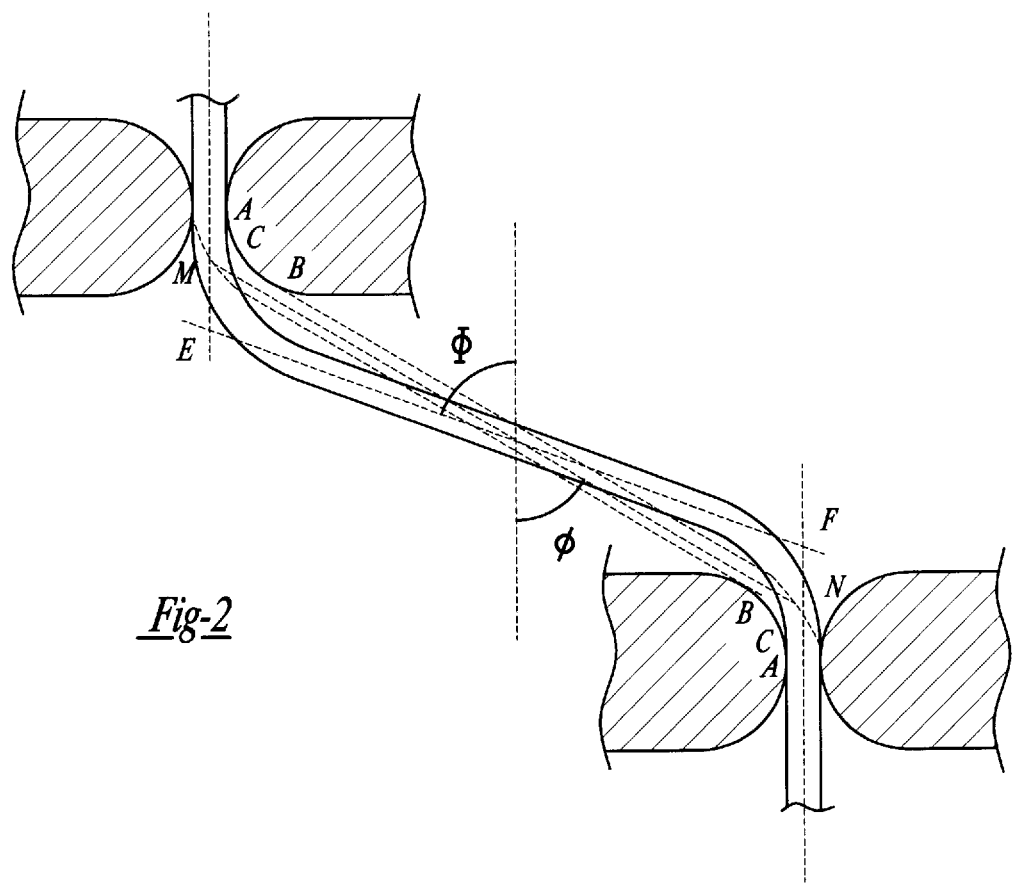

When one foresees machining with large angles of inclination, the conventional guides, whether they are closed or open, have certain disadvantages which tend to reduce their precision. This lack of precision has two main causes: first, the stresses imposed on the wire when it changes direction on coming out of the upper guide and going into the lower guide, and also its rigidity:

by communicating a sudden change of direction to the wire while it is tightened against the reference surface of the guide, the guiding profile of the conventional guides causes it to undergo stresses which become all the stronger as the radius of curvature of this profile becomes smaller; they are sufficient (and surprisingly, regardless of the angle of inclination, or of "relief") to make the wire enter the zone of plastic deformation. One then observes plastic flow and necking (see FIG. 1): the wire undulates coming out of the guides and has diameter variations; the risk of the wire breaking is high and leads to a reduction in the speed of machining by, for example, one-half when one machines with an angle of 30° or more.

one of the consequences of the rigidity of the wire is illustrated in FIG. 2: the part of the wire stretched between the guides is not perfectly linear, even under high mechanical tension; instead of remaining applied to the guiding profile along the arc delimited by the theoretical tangential points, called A and B in FIG. 2, the wire rapidly diverges from them (point C); moreover, it curves more or less slightly depending on its elasticity and the mechanical tension to which it is subjected; thus, there is a deviation of the real path (segment EF) of the wire between the guides with respect to the theoretical path (segment MN); the real angle of inclination $\Phi$ is different from the theoretical angle of inclination $\Phi$, resulting in nonconformity of the cut surface of the piece.

There is no known means of overcoming the defects due to plastic deformation, and one has been satisfied with choosing a material for the wire which is as "soft" as possible, that is to say which has the best resistance to this plastic deformation. The error in position of the reference point of the guides could be corrected by repositioning these guides, and to a certain extent, by acting on the mechanical tension of the wire, but the great problem is that these two types of defects are difficult to control because they depend on the mechanical properties of the wire; now these properties change in the course of machining because they depend on the temperature of the wire and this temperature constantly varies, in particular following variations of the machining current and of the pressure of injection of the liquid which irrigates the machining zone. Moreover, the angle of inclination and the mechanical tension of the wire can vary intentionally in the course of machining, which causes defects to develop, further complicates controlling them, and therefore makes it impossible to envisage correcting them in the current state of the art.

Furthermore, the height of the points of inclination of the wire in the guides varies according to the value of the angle of inclination, whether one considers the theoretical points and angle M, N, and $\Phi$ or the real points and angle E, F and $\emptyset$ of FIG. 2. This third cause of defects is however negligible in the case of the conventional guides which, having a radius of curvature generally ranging from 0.5 to 1 mm, make this displacement then only on the order of $50\mu$.

The object of the present invention is an electroerosion machine equipped with wire guides shaped in such a way as to reduce and even to eliminate plastic deformation of the wire electrode. This pertains to wire guides which have a guiding profile with a large radius of curvature, which allows the wire to remain in an elastic zone.

A second object of the present invention is an electroerosion machine equipped with a means for carrying out a cycle of measurements, preferably automatic measurements, intended to determine the height of at least one of the points of inclination of the wire, (or of another related value) for each value of the relief angle, with the reference height of the guides remaining unchanged. This cycle will allow one to correct the programming of the relative movement of one of the two wire guides by determining the real height of the points of inclination of the wire. It additionally allows one to calculate the exact value of the radius of curvature of the guiding profile of a wire guide according to the present invention.

Whereas the guiding profile of the conventional guides has a radius of curvature on the order of approximately 0.5 to 1 mm, whether this pertains to closed or open guides, that of the guides of the present invention is greater than 1.5 mm; it is generally on the order of a few millimeters for the currently marketed wire electrodes. The appropriate radius can be chosen as a function of the cross-section of the wire and its elongation coefficient using, for example, the following formula:

$$\frac{\Delta L}{L} = \frac{r}{r+R}$$

in which r designates the radius of the wire, R the radius of curvature of the guiding profile, and $\Delta L/L$ the elongation coefficient corresponding to the limit of elastic deformation of the wire under consideration.

Figure 3:
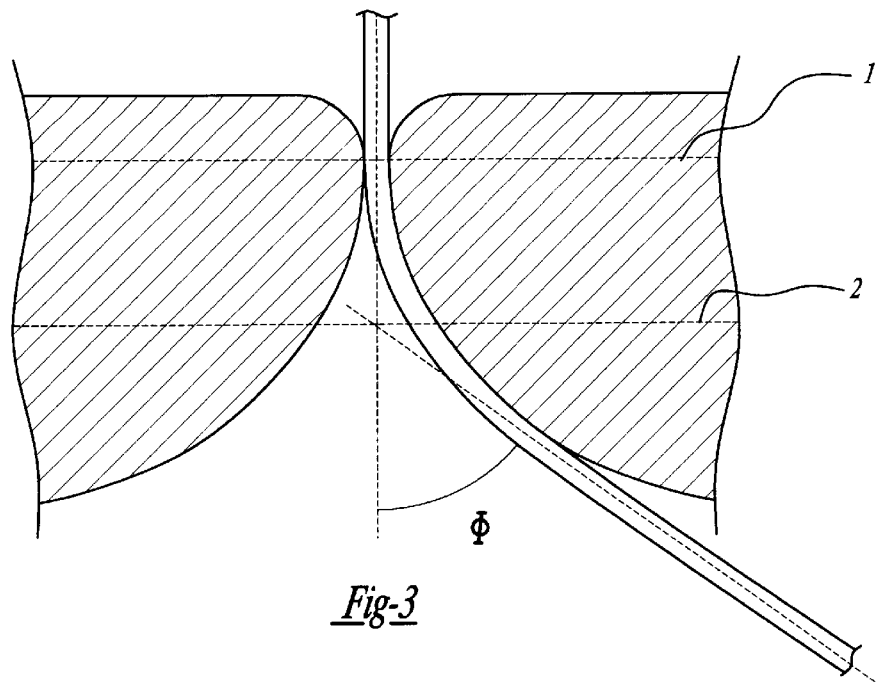

Thus, for a wire with an elastic elongation coefficient of 2% and with a diameter of 0.2 mm, one will chose a guide with a radius of curvature of approximately 5 mm. An example of a closed guide according to the invention is illustrated in FIG. 3.

It is important to note that the guides according to the present invention have an almost perfect rotational shape and a guiding profile with an almost constant radius of curvature. The coordinates of the points of inclination of the wire according to the X, Y and U, V or X', Y' axes consequently remain invariant; the advantage is that one therefore needs only to take into account the vertical displacement of these points.

It is important not only for each of the guides to have a guiding profile with an almost constant radius of curvature, but also for this radius to be the same for the two guides. These guides are therefore preferably paired during their manufacture.

But with such radii of curvature, the vertical displacement of the points of inclination of the wire in the guides, as a function of the angle of inclination, is no longer negligible (on the order of 100µ, for example, with a radius of 5 mm and a relief angle of 30°). This is why the applicant had the idea of correcting the programming of the relative movement in these wire guides in order to take into account the change in the height of their plane of reference each time one varies the relief angle.

There are mathematical formulas which allow one to calculate the distances from the points of inclination of the guides to the machine's plane of reference, knowing the distance between the planes of reference of the guides, the height of at least one of these guides, the angle of inclination, and the radius of curvature. But even if one is sure that the guides according to the present invention have an almost perfect rotational shape and a guiding profile with an almost constant radius of curvature, this radius is not known precisely enough. This is why the applicant has provided the means of carrying out an automatic cycle of measurements in order to determine the height of the points of inclination of the wire for different values of the angle of inclination without modifying the vertical height of the guides.

Before describing as an example one of the possible embodiments of the cycles of measurements, let us review the following elements which are valid for the majority of wire electroerosion machines with numerical control.

The X and Y axes are the axes of relative movement between the piece to be machined and the lower guide, for example, those of the table with crosswise movements supporting either the piece to be machined and its system of fastening (when the piece is mobile) or the lower guide (when the piece is stationary). The U and V axes are the axes of the table with crosswise movements supporting the upper wire guide; they allow one to incline the wire and are parallel to the X and Y axes. The Z axis manages the vertical movement of the upper wire guide (and allows for adaptation to the different heights of pieces to be machined).

The machine has a system of fixed, absolute axes defined on certain types of machines by optical sensors or rulers installed on the machine; it is immutable because the position of the references on the rulers does not change.

A system of modifiable axes, called "machine axes", is defined by the operator, whereas the machining path or tool path is generally programmed according to another system of modifiable axes called "piece axes". The contour of the path or of the surface to be cut is broken down into a series of straight or curved segments, and a program defines their linear or curved coordinates as well as the machining conditions associated with each of these segments in the form of a "block" of instructions.

Figure 4A:
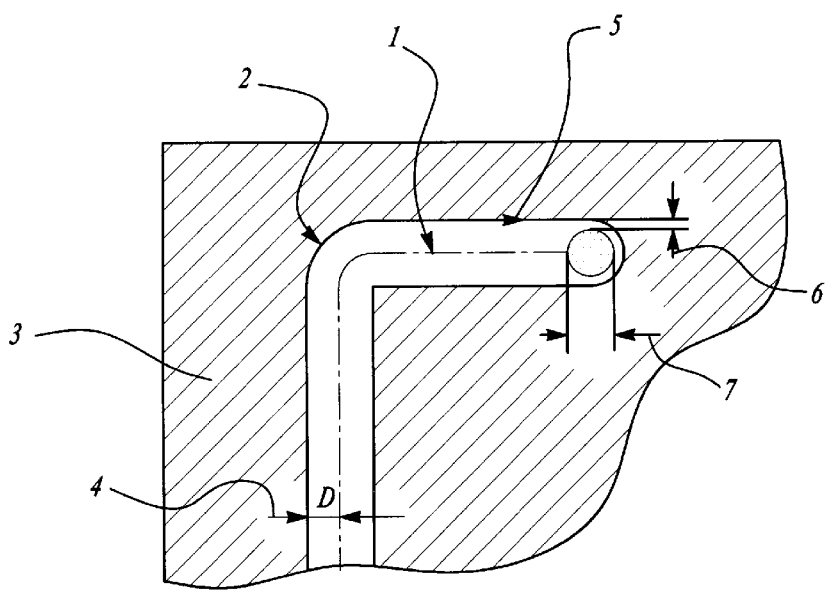
Figure 4B:
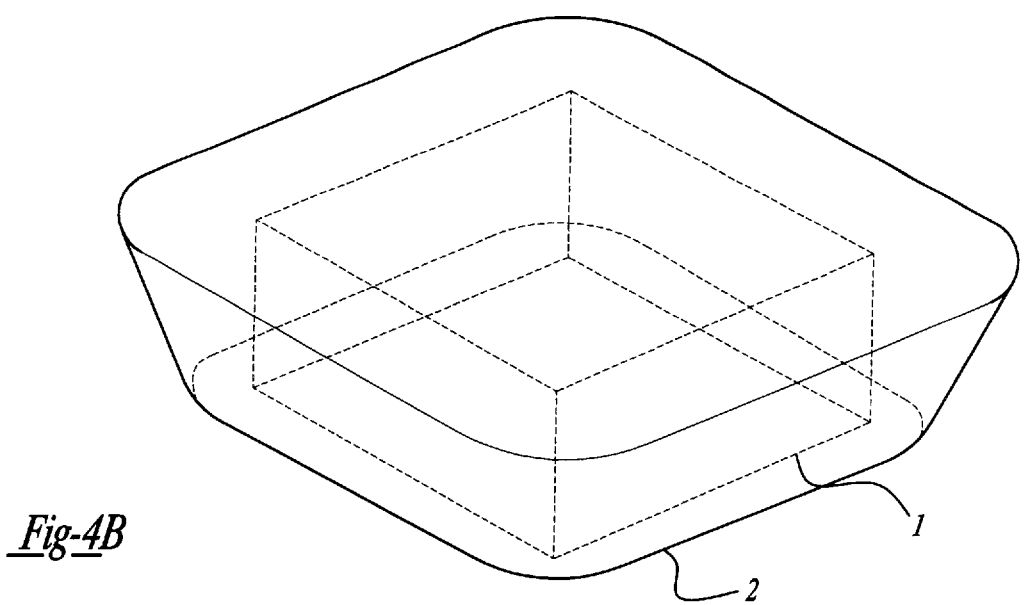

A control can allow one to move the injection nozzle and the upper wire guide along the Z axis in order to position them as a function of the height of the piece to be machined. Certain numerical controls have a first software program allowing one to shift the path of the wire with respect to the contour of the path to be cut and/or a second software program allowing one to move the U and V axes in order to execute the desired relief angle (see FIGS. 4a and 4b).

In this example of a measurement cycle according to the present invention, which is only one particular variant, the following operations can be carried out manually; for example, with a remote control and the front panel of the switch cabinet of the machine. It can also advantageously be done automatically using a control word, for example, inserted in the program.

Figure 5:
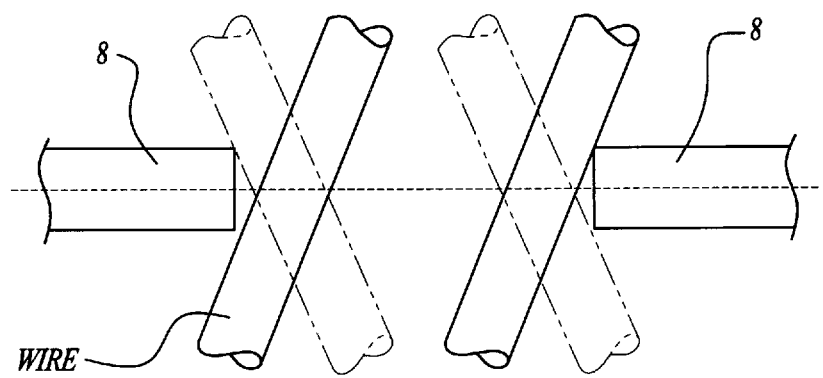

The measurements are made according to the principle of electric contacts—which is well known in the state of the art—which allows one to detect the position of an obstacle coming in contact with the wire carrying an electric current thanks to the appearance of a short circuit (see FIG. 5). The measurements are preferably made under the machining conditions: correct running speed and mechanical tension of the wire; in the case of immersion machining, work tank full, water correctly deionized and thermostabilized; measuring eye eyepiece 8 is degreased, demagnetized and carefully aligned with the machine plane of reference P1.

Figure 6:
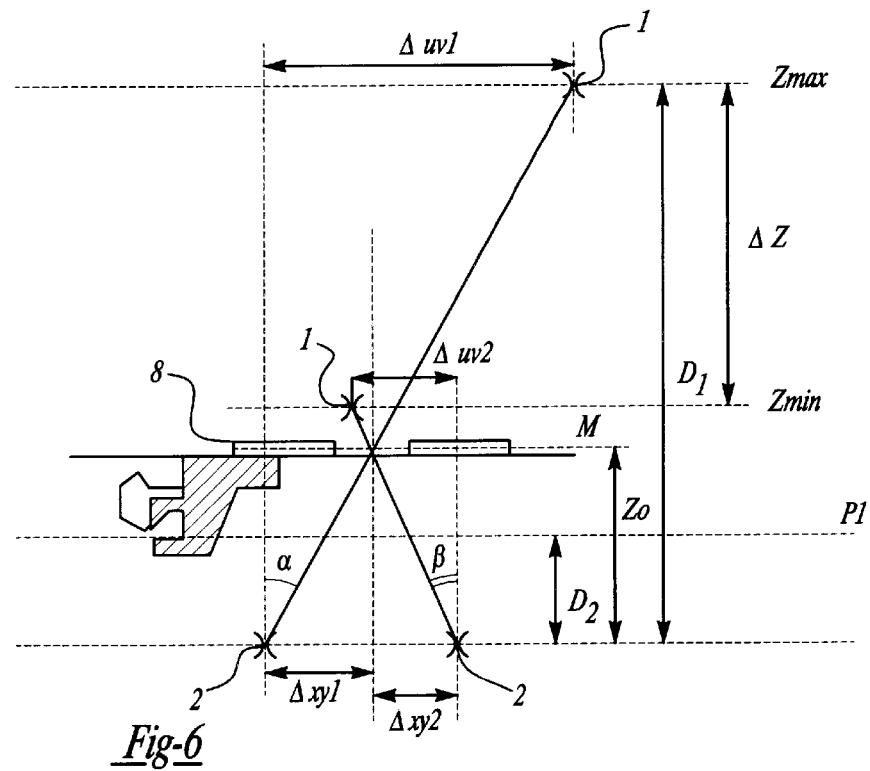

A function of the numerical control of the wire machine, associated with measurement and calculation devices, determines the position of the wire guides by measuring and calculating:

1) the distance D1 between the heights of the two guides 1 and 2 and
2) the distance D2 between the height of lower guide 2 and the machine plane of reference (see FIG. 6), for a given height of this reference plane and a given eye eyepiece thickness, thus performing what is called a "regulation of the guides". The distance D1 is obtained by determining $\Delta Z$, the difference between the absolute 0 height and the machine 0 height. This allows the numerical control to move the guides in such a way as to comply with the relief angle and the machining path programmed in the blocks of instructions.

This "regulation of the guides" cycle includes the following steps:

alignment and centering of the wire (done by electric contacts in the 4 directions), so that it is perpendicular to the plane of reference and passes through the center of the eyepiece;

one brings the upper guide into high position (height Zmax), and after having inclined the wire by a given angle, 1° in this example, and having centered it in the eyepiece by moving the upper guide b by a known quantity $\Delta UV$; one reads the movement $\Delta XY$ of the lower guide; this allows one to calculate $\Delta Z'$ approximately:

$$\sigma Z' = Zmax - (Zo \times \Delta uv)/\Delta xy$$

Zo being the difference between the height of lower guide 2 and that of the eyepiece, in order to allow bringing the upper guide into low position (height Zmin) without risking a collision with the eyepiece;

one leaves the upper guide in high position, and one inclines the wire on one side of the neutral axis by an angle $\alpha$ chosen by the operator, one centers the wire, and one reads the movement $\Delta xy$ of the lower guide; one inclines the wire on the other side of the neutral axis, still by angle $\alpha$, and after centering, one reads the movement $\Delta xy$ of the lower guide; one repeats these operations in the perpendicular directions; then one calculates the average value $\Delta xy1$ of the movements of the lower guide corresponding to the movement $\Delta uv1$ of the upper guide (FIG. 6); then, one brings the upper guide into low position, and one repeats the two operations above with an angle of inclination $\beta$ which is generally very slightly different from angle $\alpha$; one obtains an average value $\Delta xy2$ for the movement of the lower guide corresponding to the movement $\Delta uv2$ of the upper guide;

this allows one to calculate the exact value of D1 and of D2:

$$D1 = \Delta z \frac{\Delta uv1 \times \Delta xy2}{\Delta uv1 \times \Delta xy2 - \Delta uv2 \times \Delta xy1}$$

$\Delta z$ being the difference between the heights Zmax and Zmin of the high and low positions of upper guide 1, and:

$$D2 = D1 \times \frac{\Delta xy1}{\Delta uv1} - Zo$$

Zo being the height of the eyepiece. It is assumed that the 0 height is that of the lower guide.

According to the present invention, one carries out a "regulation of the guides" for different values of the relief angle $\Phi$. In this example these values are 3°, 5°, 10°, 15° and 20°.

Figure 7:
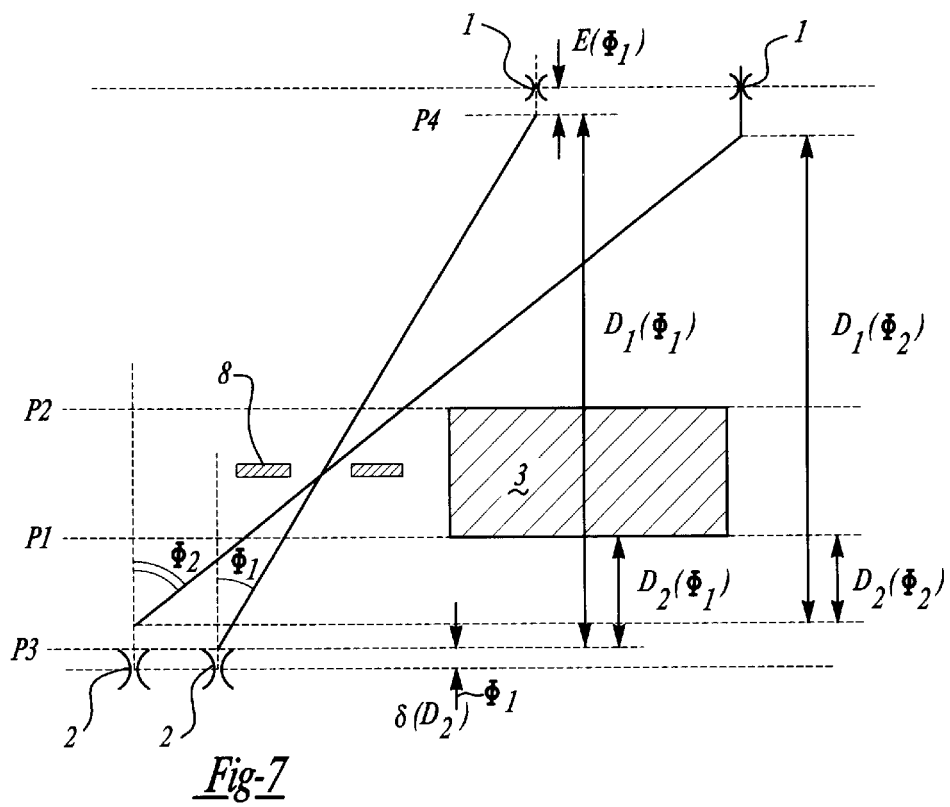

The values D1 obtained for the different relief angles are in fact the different distances between the heights of the points of inclination of the wire in the two guides 1 and 2 (see FIG. 7).

The piece to be machined 3 is generally aligned so that its lower surface, also called "setting", is the same as the machine plane of reference P1; its upper surface can be contained in a plane P2 called the "secondary plane".

Figure 8A:
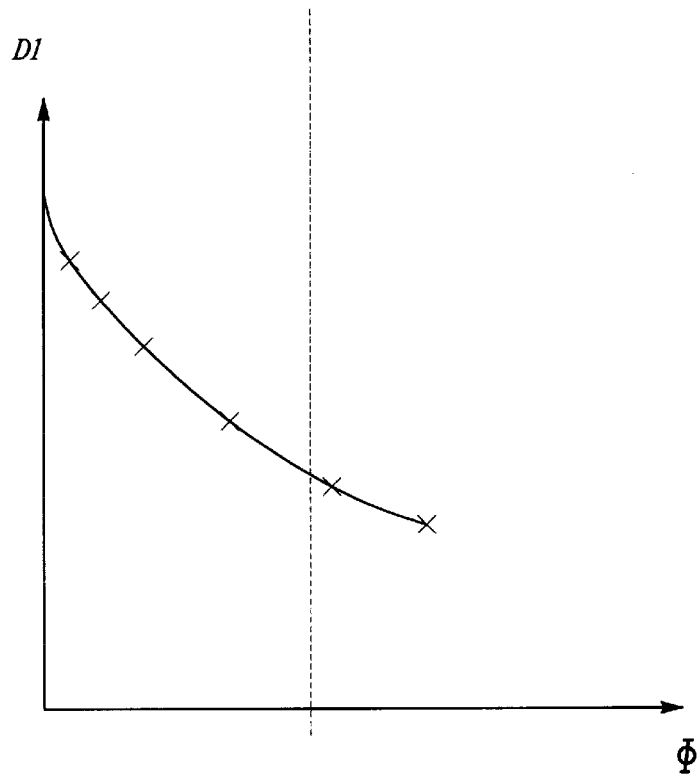
Figure 8B:
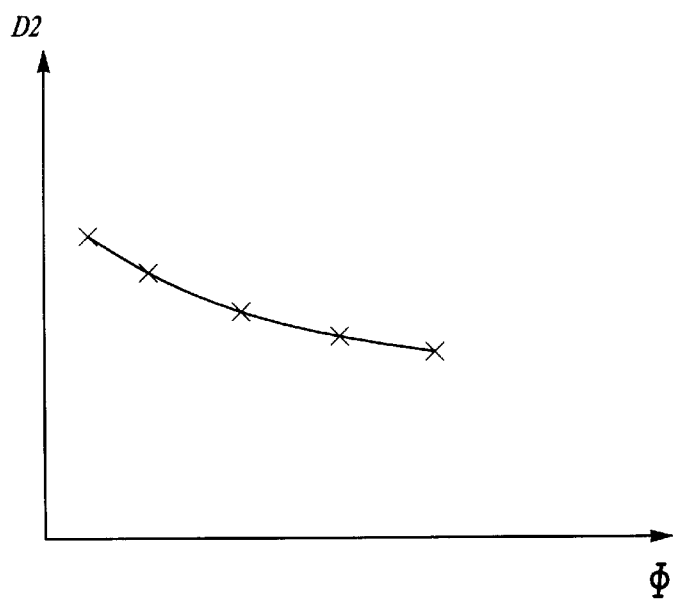

Then, a calculation unit stores in memory the values obtained for D1 and D2 and establishes the curves corresponding to their variation as a function of the relief angle $\Phi$ which is the real angle (see FIGS. 8a and 8b). In order to calculate the height of the points of inclination at 0°, one can extrapolate the curves obtained or approximate with the last measured and calculated value, for example, at 3°.

The numerical control then uses these curves to determine the distances D1 and D2 corresponding to the values of the relief angle $\Phi$ indicated in the block of instructions of the program. It deduces from this, in real time, the movements UV and XY of the guides, by projecting the coordinates of the path segments on the planes P3 and P4 containing the points of inclination of the wire. The numerical control can perform this correction in real time for each block of instructions.

This way of determining the various planes of the points of inclination of the wire corresponding to different angles of inclination has been described as an example in reference to one of the types of wire machine of the applicant; but it can vary from machine to machine, according to the different systems of reference which are used, the architectures of the numerical controls, and the regulation and measurement devices provided.

Thus the eyepiece with electric contact described above can be replaced by any other device, with or without electric contact, known in the state of the art.

In certain cases, particularly when the upper and lower guides have an almost identical geometry, it is possible to assume that $\Delta(D2)=E$ or since $\Delta(D1)=\Delta(D2)+E$, $\Delta(D1)=2\times \Delta(D2)$ (see FIG. 7). It is then possible to simplify the measurement cycles and the correction procedure by only calculating and storing in memory one of the magnitudes D1 or D2.

One can also simplify the centering measurements, for example, by only doing the electric contacts on the upper surface (or lower surface) of the eyepiece, which reduces the operations by half; in this case, the centering is no longer done in the median plane M of the eyepiece, but in that of its upper surface. One can also only perform the centering measurements by electric contacts in the two directions of the same plane and to do the measurements in the perpendicular plane; this also allows one to reduce the operations by half.

It is remarkable that this cycle allows one to overcome not only the defect due to the vertical movement of the points of inclination of the wire in the guides when one modifies the angle of inclination, but also the defect resulting from the rigidity of the wire, since this cycle gives the height of the real points of inclination; the theoretical tangential points are therefore no longer involved.

The present invention therefore allows one to very significantly improve the precision of the cuts, especially in the case of cuts with variable relief angle. Above all it allows for a remarkable repeatability of the machining. For example, in the case of a punch-die assembly in the form of a star with a relief angle of 9°, the punch can be fit in the die with the branches of the star in any position, with a height difference of 0 to $5\mu$, instead of being 0 to $100\mu$ when one does not use the guides and the system of correction of the present invention. Let us indicate that it also allows for excellent precision of the relief angle: the error is 4 to $9\mu$ instead of 20 to $120\mu$ when one does not use the present invention.

I claim:

1. An electroerosion device having a wire electrode stretched and wound between a pair of spaced wire guides at an angle of inclination, means for selectively moving said wire guides to selectively vary the angle of inclination of said wire electrode, said wire guides having a wire guiding profile with a radius of curvature equal to a value RL in the formula $$\Delta L/L = r/(r+RL)$$

in which r designates the radius of said electrode wire, R the radius of curvature of the guiding profile, and in which $\Delta L/L$ designates the coefficient of elongation corresponding to the limit of elastic deformation of said wire electrode.

2. The device as defined in claim 1 and including means for measuring the points of inclination of said wire electrode in said wire guides to thereby determine the angle of inclination of said wire electrode and means for varying the position of said wire guides to position said points of inclination of said wire electrode to achieve the desired angle of inclination of said wire electrode.

\* \* \* \* \*